United States Patent
Vogman

(10) Patent No.: US 9,874,927 B2
(45) Date of Patent: Jan. 23, 2018

(54) METHOD AND APPARATUS FOR PRECISION CPU MAXIMUM POWER DETECTION

(71) Applicant: INTEL CORPORATION, Santa Clara, CA (US)

(72) Inventor: Viktor Vogman, Olympia, WA (US)

(73) Assignee: INTEL CORPORATION, Santa Clara, CA (US)

( * ) Notice: Subject to any disclaimer, the term of this patent is extended or adjusted under 35 U.S.C. 154(b) by 67 days.

(21) Appl. No.: 14/316,133

(22) Filed: Jun. 26, 2014

(65) Prior Publication Data

US 2015/0378429 A1    Dec. 31, 2015

(51) Int. Cl.
 *G06F 1/32*    (2006.01)
(52) U.S. Cl.
 CPC .................................. *G06F 1/3296* (2013.01)
(58) Field of Classification Search
 CPC ..................................................... G06F 1/3296
 See application file for complete search history.

(56) References Cited

U.S. PATENT DOCUMENTS

| | | | | |
|---|---|---|---|---|
| 4,249,068 A * | 2/1981 | Mangan | ................. | H02K 15/12 219/497 |
| 5,126,537 A * | 6/1992 | Kadwell | ............ | G05D 23/1917 219/497 |
| 5,841,204 A * | 11/1998 | English | .................. | G05D 23/22 219/494 |
| 6,518,782 B1 * | 2/2003 | Turner | ................. | G01R 21/002 324/750.03 |
| 6,552,446 B1 * | 4/2003 | Lomba | .................. | H02J 7/0063 307/45 |
| 6,789,037 B2 * | 9/2004 | Gunther | ................. | G01K 7/015 374/E7.036 |
| 7,492,171 B2 | 2/2009 | Vogman | | |
| 2006/0028257 A1 * | 2/2006 | Huang | ............... | H03K 17/0822 327/175 |
| 2006/0071756 A1 * | 4/2006 | Steeves | .............. | G06K 7/10108 340/10.1 |
| 2007/0006213 A1 * | 1/2007 | Shahidzadeh | ........... | G06F 9/445 717/171 |
| 2009/0051326 A1 * | 2/2009 | Wang | .................... | H02J 7/0031 320/154 |
| 2009/0167330 A1 | 7/2009 | Vogman | | |
| 2011/0078479 A1 | 3/2011 | Vogman | | |
| 2011/0138216 A1 * | 6/2011 | Chen | ........................ | G06F 1/04 713/503 |

(Continued)

*Primary Examiner* — Thomas Lee
*Assistant Examiner* — Mohammad A Rahman
(74) *Attorney, Agent, or Firm* — Stoel Rives LLP

(57) ABSTRACT

A power detection circuit includes a sense element to convey current from a source to a load, a compensating reference element located proximate to the sense element, a comparator, and a precision current sink. The comparator includes a first input coupled to the sense element, a second input coupled to the compensating reference element, and an output. The comparator is configured to assert a signal on the output in response detecting that a first voltage on the first input equals a second voltage on the second input. The precision current sink is coupled to the second input of the comparator and is configured to pull constant current through the compensating reference element based on a predetermined power threshold.

23 Claims, 3 Drawing Sheets

(56) References Cited

U.S. PATENT DOCUMENTS

2012/0254643 A1* 10/2012 Fetzer ............... G06F 1/324
                                                    713/320
2014/0215238 A1* 7/2014 Rider ............. H02M 1/4208
                                                    713/320

* cited by examiner

METHOD AND APPARATUS FOR PRECISION CPU MAXIMUM POWER DETECTION

TECHNICAL FIELD

The present disclosure relates generally to electronic circuits. More particularly, embodiments of the present disclosure are related to the field of processor power detection systems and methods.

BACKGROUND

Electronic devices such as computers, personal digital assistants (PDAs), radiotelephones, telecommunications equipment, servers and the like continue to evolve as manufacturers of such devices continue to improve the speed, size, functionality, battery life and longevity of these devices. In such devices it is often useful to know how much current is being supplied by, or consumed by circuits, sub-circuits and components within the device. These components are typically mounted on a circuit board that interconnects the components utilizing copper planes or traces that are "sandwiched" between layers of insulating circuit board material. During the manufacture of circuit boards, the copper traces may be selectively etched from sheets of copper that are affixed to the insulating layers thereby forming traces.

There are many circumstances where it is desirable to accurately detect relatively high currents in a circuit to allow for better control of circuit operation. For example, controlling currents in a battery charging process can greatly increase battery life for battery powered devices. Determining if circuits or components are drawing excessive power can lead to measures that control these circuits such that they draw less power. Such control can greatly increase the reliability of electronic devices. Detecting current can also pinpoint systems and components that are malfunctioning or overheating and such systems can be shut down to avoid a catastrophic failure.

Traditional current sensing systems that sense relatively high currents introduce many design problems and have limited accuracy. For example, the power resistor typically utilized in current sensing systems may produce a significant voltage drop in the power line and may consume a significant amount of power. Thus, a designer may be faced with the design challenge of introducing an intrusive power loss and compensating for an intrusive voltage drop. The design challenges in current sensing technology have intensified with the new, low voltage standards. Some electrical components now require high currents at very low supply voltages. Current standards include, for example, power requirements of delivering currents of hundreds of amps at voltages of 1.8V, 1V, and below.

DETAILED DESCRIPTION OF PREFERRED EMBODIMENTS

Figure 1:
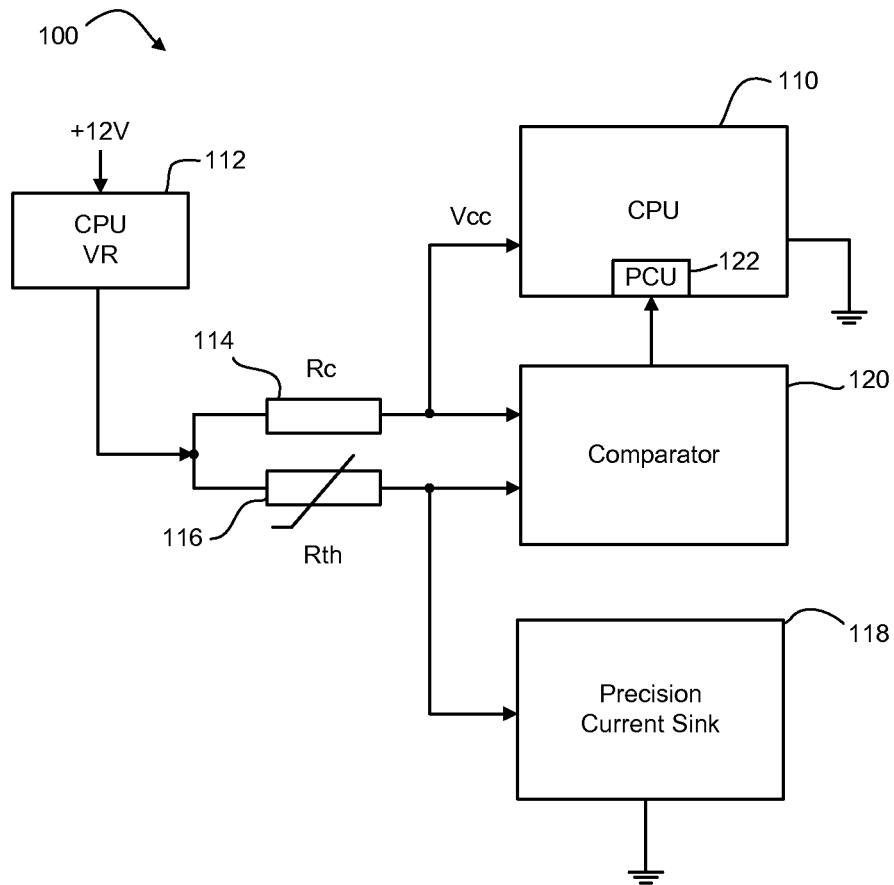
FIG. 1 is a block diagram illustrating a processor maximum power detection system according to one embodiment.

Embodiments disclosed herein provide a processor maximum power detection system that allows a precise, non-intrusive power (current) monitoring and a fast alert of a central processing unit (CPU) power virus condition. The embodiments may be used, for example, to reduce the size and/or cost of a system's CPU voltage regulator and/or power supply. Certain embodiments include a precision current sink element, positive thermal coefficient thermistor, and a comparator to enable accurate, temperature independent CPU max power ($P_{MAX}$) detection at supply voltages approaching a few hundred millivolts.

In server systems or other computer systems, the power supply is generally sized for full system configuration running power virus software. This results in larger power supply size and/or wattage rating and higher system cost. In high density systems, the power supply may significantly limit the available board space and system configurations. At the same time, the system utilization in real applications remains at about a 20%-25% level, and the power supply is loaded to a small portion of its power rating (e.g., its thermal design power TDP rating). For redundant power supply configurations, where at least two power supplies share a common load, average (or typical) power supply load additionally drops by a factor of two.

In a power specification for a computer system, $P_{MAX}$ usually defines a maximum power capability of the power supply in the system. In the process of determining a value of $P_{MAX}$, system designers usually consider the worst-case configuration of a system. Thus, $P_{MAX}$ for a system represents power consumption when the system is fully populated with hardware. The determination of $P_{MAX}$ also assumes that the system is configured with the most power hungry components capable of being used in that configuration, and that the system is running software that causes it to consume maximum power.

However, most systems are populated with less hardware components than their capacity and in many cases not all the components used are the most power hungry. For example, in many systems typical applications do not need all CPU cores to go into a turbo mode at the same time and the CPU utilization does not reach 100%. On average, most systems consume power far lower than $P_{MAX}$ most of the time, and hence could function adequately with a smaller power supply and CPU voltage regulator (VR).

In certain embodiments disclosed herein, a processor maximum power detection system provides accurate $P_{MAX}$ detection and, in a power virus case, rapidly throttles the CPU to allow for a lower power rating. Thus, the size and/or cost of a system's CPU voltage regulator and/or power supply may be reduced.

In certain embodiments, the processor maximum power detection system senses CPU current on the baseboard, rather than inside the processor. A Pmax detector that uses maximum power detection circuitry inside the processor may have a reduced accuracy in output voltage monitoring mode due to load line variance, and in current monitoring mode due to temperature difference between current sensor portions located on the baseboard and inside the package. Embodiments disclosed herein that sense CPU current on the baseboard provide improved detector accuracy by eliminating both of these errors to provide an effective Pmax detection solution.

FIG. 1 is a block diagram illustrating a processor maximum power detection system 100 according to one embodiment. The system 100 includes a processor (CPU) 110, a CPU voltage regulator (VR) 112, a sense element 114 (with resistance Rc), a compensating reference element 116 (with resistance Rth), a precision current sink (PCS) 118, and a comparator 120. The CPU 110 may be mounted to a baseboard (e.g., motherboard) and the sense element 114 comprises a power plane between layers of insulating circuit board material of the baseboard. The power plane comprises a highly conductive material, such as copper. The compensating reference element 116 is also located on or in the baseboard. One or more of the other elements shown in FIG. 1 (the CPU VR 112, the comparator 120, and the precision current sink 118) may also be on the baseboard.

An input voltage (e.g., +12V) generated by a power supply is fed to an input of the CPU VR 112, which converts the input voltage into a low processor voltage (e.g., in a range between about 0.6V and about 1.8V) to be supplied to the CPU 110 (e.g., at CPU input Vcc). The sense element 114 is configured to convey a current from the CPU VR 112 to the CPU 110. The sense element 114 has a resistance Rc (representing the resistance of the power plane), which changes proportional to a change in its temperature. The compensating reference element 116 is located proximate to the sense element 114 and due to their close proximity, the compensating reference element 116 has a resistance Rth that changes proportional to a change in temperature of the sense element 114. This feature virtually eliminates measurement errors due to thermal drift. In one embodiment, the compensating reference element 116 comprises a positive thermal coefficient (PTC) thermistor with resistance Rth.

The precision current sink 118 pulls constant current (e.g., which varies less than 1%) through the compensating reference element 116 (also referred to herein as "compensation resistance Rth" or simply "resistance Rth") to provide a precision voltage reference on a first input of the comparator 120. The precision voltage reference may correspond, for example, to a preset power virus level or other power threshold level. A second input of the comparator 120 is connected to the sense element 114 (also referred to herein as "sense resistance Rc" or simply "resistance Rc") at the CPU's Vcc input. When the voltage drop across the sense resistance Rc becomes equal to the voltage drop across the compensation resistance Rth, the comparator 120 changes its state (i.e., trips). An output signal of the comparator 120 is provided to the CPU's power control unit (PCU) 122 within a fraction of a microsecond to trigger CPU power throttling each time the comparator 120 trips. Thus, a current spike caused by a power virus event that normally would last several milliseconds is reduced to less than 1 µs, which is "invisible" to the power train.

Figure 2:
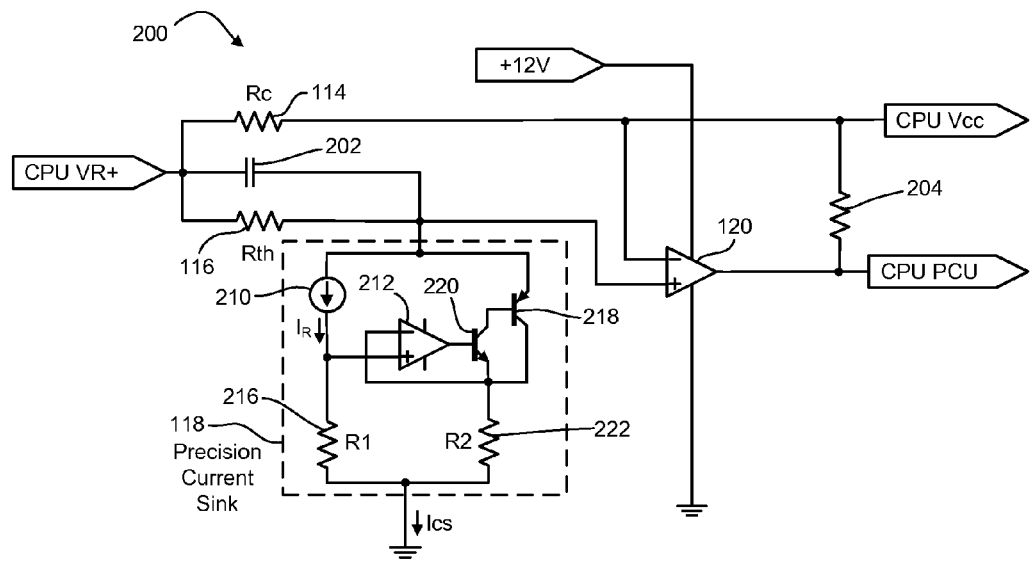
FIG. 2 is a schematic diagram of a processor maximum power detector according to one embodiment.

FIG. 2 is a schematic diagram of a processor maximum power detector 200 according to one embodiment. The particular implementation of the processor maximum power detector 200 shown in FIG. 2 is provided by way of example and persons skilled in the art will recognize that many other designs or modifications may be used. Similar to the system 100 shown in FIG. 1, the detector 200 includes a sense element 114 (e.g., represented by a resistance Rc of a power plane), a compensating reference element 116 (e.g., represented by a resistance Rth of a PTC thermistor), a precision current sink 118, and a comparator 120. The detector 200 also includes a capacitor 202 to provide noise suppression for a voltage (CPU VR+) received from a voltage regulator, such as the CPU VR 112 shown in FIG. 1. The comparator 120 is powered by a DC voltage (+12V), and has an output coupled to the CPU's power control unit (CPU PCU), which is pulled up to the CPU's Vcc input (CPU Vcc) through a resistor 204.

To reduce or minimize power distribution losses according to certain embodiments, the power plane representing the sense element 114 is designed to have a very low resistance Rc, e.g., a fraction of one milliohm. In certain embodiments, the compensating reference element 116 may have a resistance Rth of tens of ohms and is placed in close proximity to the sense element 114. Such proximity of the sense element 114 and the compensating reference element 116 allows the elements 114, 116 to maintain a similar temperature to one another. Thus, the elements 114, 116 exhibit similar changes in voltage drop to one another due to a change in temperature, which greatly reduces errors caused by temperature variations.

In the example shown in FIG. 2, the precision current sink 118 includes a reference current element 210 that provides precision current $I_R$ to a non-inverting input of a power operational amplifier 212 and a resistor 216 having a resistance R1. The power operational amplifier 212 cooperates with transistors 218, 220 to provide a low impedance buffered output of the voltage on the non-inverting input to a resistor 222 having a resistance R2. The current $I_{CS}$ pulled by the precision current sink 118 may be programmed or configured as $I_{CS}=I_R \times (R1/R2)$. Thus, the resistor 216 sets the current through the resistor 222 and the compensating reference element 116. Skilled persons will recognize from the disclosure herein that other embodiments may be used for the precision current sink 118, and that the precision current sink 118 may be realized with discrete components as shown in the diagram FIG. 2, or with standard integrated circuits such as LM134-LM334 by Texas Instruments or LT3092 by Linear Technology operating down to Vcc=1.2V. Further, for example, the comparator's inverting and non-inverting inputs maybe swapped if different (e.g., active low) polarity alert signal is used.

In operation, the current sunk by the precision current sink 118 generates a voltage drop across the resistance Rth of the compensating reference element 116 to lower the voltage level at the non-inverting input of the comparator 212 to a selected level, which corresponds to the CPU power virus condition or other power threshold level. A processor current drawn through the power plane also generates a voltage drop across the resistance Rc of the sense element 114 to lower a voltage level at an inverting input of the comparator 212. As current through the resistance Rc varies, so does the bias at the inverting input of the comparator 212. As the sense element 114 with resistance Rc heats up, so does the compensating reference element 116 with resistance Rth due to its location in the close proximity to the sense element 114. Thus, the compensating reference element 116 compensates for power plane resistance thermal drift and maintains a constant CPU current (power) trip point.

Once a power virus condition occurs and voltages at the inverting and non-inverting inputs become equal, the comparator 212 trips and sends an alert signal to the CPU's PCU 122 (shown in FIG. 1). The PCU 122 throttles processor power in a fraction of 1 µs. Because the comparator trips when voltages across the resistances Rc and Rth are equal, the CPU's current trip point $I_{CRU\_TRIP}$ can be described by equation: $I_{CPU\_TRIP}=ICS*Rth/Rc$, where Ics is the current pulled by precision current sink 118.

If thermal coefficients (a) of the sense element 114 and the compensating reference element 116 are substantially identical, their thermal factors $(1+\alpha \cdot t°)$, where t° represents the temperature of the elements 114, 116, cancel each other in the numerator and denominator of the $I_{CPU\_TRIP}$ equation. In such embodiments, the detector trip point depends only on the sink current variance and Rth and Rc resistance tolerances at room temperature. If the resistor 216 and the resistor 222 have about 0.1% tolerances, and the Rth and Rc tolerances at room temperature do not exceed about 1%, a worst case total detection error equals about 2.2%.

Rather than using a PTC thermistor, in one embodiment the compensating reference element 116 comprises a serpentine narrow copper trace placed in close proximity of the power plane represented by the sense element 114. Because the sense element 114 and the compensating reference element 116 have identical thermal resistance coefficients and have the same temperature condition, according to certain embodiments, the CPU current trip point remains unchanged in a full temperature range.

Figure 3:
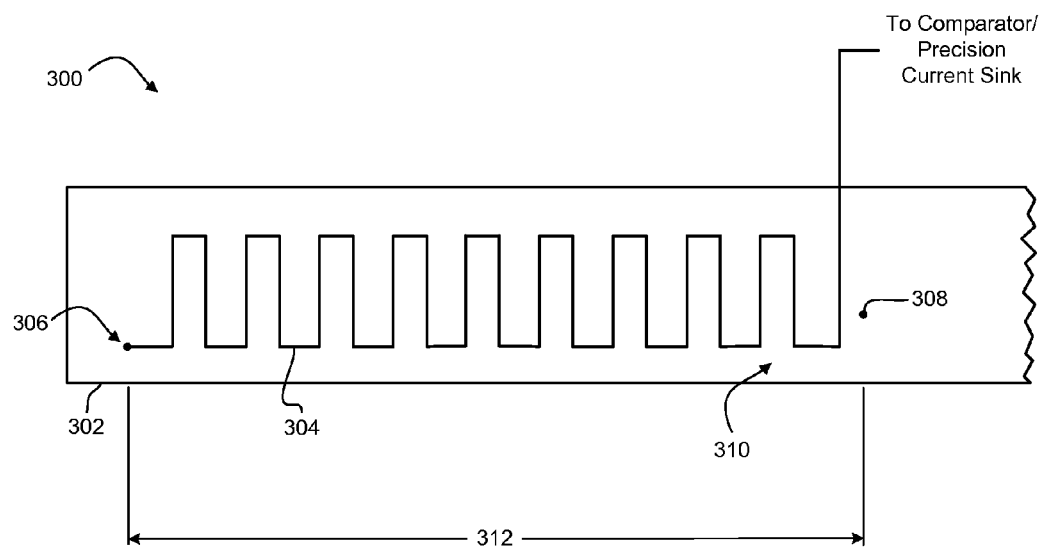
FIG. 3 is a schematic diagram of a current sensing configuration including a compensation element superimposed on a sense element according to one embodiment.

For example, FIG. 3 is a schematic diagram of a current sensing configuration 300 including a compensation element 304 superimposed on a sense element 302 according to one embodiment. The sense element 302 comprises a power plane or circuit trace embodiment and the compensation element 304 comprises a smaller circuit trace embodiment. All conductors have some resistance, and generally the more cross sectional area of the conductor, the less the resistance of the conductor. Thus, the sense element 302 can be a circuit trace sized according to the amount of current that it will carry in a particular design. For example, a trace such as trace 312 circuit can be designed to safely accommodate currents of over 100 amps while providing a voltage drop in the tens of millivolts range. Thus, the amount of resistance that is desired for the specific circuit design can dictate the cross sectional area of the circuit trace sense element 302. The sense element 302 can have a relatively large cross sectional area to safely accommodate large currents and thus the sense element 302 can provide a low resistive loss during operation. In one embodiment, a resistance between node 306 and node 308 can be on the order of a few hundred microhms.

A plated through hole (via) at node 306 can electrically connect the sense element 302 to compensation element 304, at a single point. For example, the node 306 may be connected to the output of the CPU VR 112 shown in FIG. 1 or the CPU VR+ signal shown in FIG. 2. An insulator 310 can be placed between the sense element 302 and the compensation element 304 to electrically insulate the sense element 302 from the compensation element 304 at locations other than the plated through hole (via) at node 306. The sense element 302 (trace or power plane) can be sized such that it can accommodate a high current that will pass through the trace and provide the desired voltage drop. A substantially narrower and longer trace can be fabricated on top of the insulator 310 to create compensation element 304. Compensation element 304 can have a significantly higher resistance. It conducts a much lower "compensation" current than the sense element 302, such that the voltage drop on the narrower trace (the compensation element 304) is on the order of the voltage drop across the sense element 302. Thus, although their currents are significantly different, the sense element 302 and the compensation element 304 can have voltage drops that are substantially similar. For example, the voltage drop across the sense element 302 and the voltage drop across compensation element 304 can be on the order or a few tens of millivolts.

One way for the compensation element 304 to achieve such a resistance and such a voltage drop is to make the compensation element 304 narrow and relatively long by using a serpentine pattern or "zigzagging" the conductive trace across the sense element 302 multiple times from a first via at node 306 towards a second via at node 308 along the length 312 of the sense element 302. Overlaying the compensation element 304 over the sense element 302 ensures that these elements have the same, or nearly the same, temperature during operation. The sense element 302 and the compensation element 304 are made from materials having the same thermal properties such that they will exhibit the same voltage changes due to changes in temperature.

In the manufacture of the sense element 302 and the compensation element 304, the sense element 302 can be etched on an interior layer of the printed circuit board and the compensation element 304 can be etched on an adjacent circuit board layer. Thus, the insulating layer 310 can be placed between the sense element 302 and the compensation element 304. The insulating layer 310 can be placed to electrically insulate the current sense element 302 from the compensation element 304, however, if reduced thermal insulation properties are desired, a material such as mica could be utilized as an insulator. Insulating the elements 302 and 304 from each other is relatively easy, because of the relatively low voltage differential between the elements 302 and 304. Thus, a simple circuit board masking material may also be utilized.

The resistance between node A 306 and node B 308 can be described mathematically as $R(302 \text{ A-B}) = ((0.658 \times \ln(L/d))/(\pi \times Th))$ where the resistance in milliohms is measured between node A and node B, L is the length of the trace, d is the via diameter, and Th is the layer thickness. To calculate the voltage drop across the compensation element 304, $V(304) = I(304) \times R(304) \times (1 + (\alpha R2 \times \Delta t))$, where R(304) is the resistance of the compensation element 304, I(304) is the current through the compensation element 304, $\alpha$=the temperature coefficient of the compensation element 304 and $\Delta t$=the change in temperature. Such a calculation can be utilized in determining what size of trace could be utilized to design a trace for given design parameters.

Figure 4:
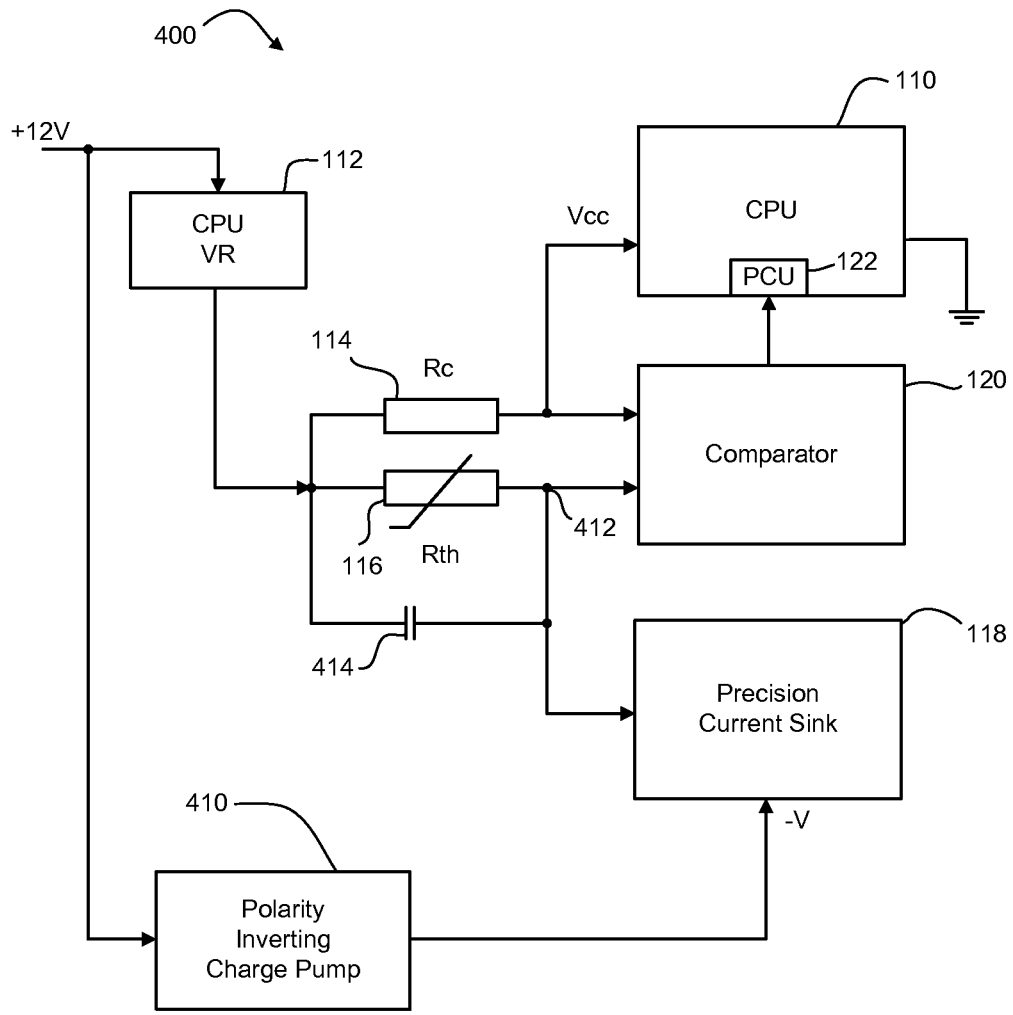
FIG. 4 is a block diagram illustrating an extra low CPU voltage detector 400 according to one embodiment.

FIG. 4 is a block diagram illustrating an extra low CPU voltage detector 400 according to one embodiment. The detector 400 is configured to monitor the CPU current at extra low CPU voltages, e.g., 1.0V down to two or three hundred millivolts. The detector 400 includes a CPU 110, a CPU VR 112, a sense element 114 (with resistance Rc), a compensating reference element 116 (with resistance Rth), a precision current sink (PCS) 118, a comparator 120, and a polarity inverting charge pump 410. The polarity inverting charge pump 410 may include, for example, one or more LT1054 integrated circuits available from Linear Technology.

As discussed above with respect to FIG. 1, input voltage generated by a power supply (e.g., +12V) is fed to an input of the CPU VR 112, which converts the input voltage into a low processor voltage supplied to the CPU 110 (e.g., at CPU input Vcc). The sense element 114 comprises a power plane between layers of insulating circuit board material of a baseboard. As discussed above, the CPU 110, the compensating reference element 116, and one or more of the CPU VR 112, the comparator 120, the precision current sink 118, and the polarity inverting charge pump 410 are on or in the baseboard. The compensating reference element 116 may comprise a PTC thermistor or a serpentine narrow trace overlying the power plane, as discussed above.

The precision current sink 118 pulls constant current through the compensating reference element 116 to provide a precision voltage reference on a first input of the comparator 120. The precision voltage reference may correspond, for example, to a preset power virus level or other power threshold level. A second input of the comparator 120 is connected to the sense element 114 at the CPU's Vcc input. When the voltage drop across the resistance Rc becomes equal to the voltage drop across the resistance Rth, the comparator 120 changes its state (i.e., trips). An output signal of the comparator 120 is provided to the CPU's power control unit (PCU) 122 within a fraction of a microsecond and triggers CPU power throttling each time the comparator 120 trips. Thus, a current spike caused by a power virus event that normally would last several milliseconds is reduced to below 1 μs, which is "invisible" to the power train.

To detect power virus at extra low CPU voltages, the precision current sink 118 is negatively biased to provide a sufficient voltage across the precision current sink 118. In the example embodiment shown in FIG. 4, this is achieved by the polarity inverting charge pump 410 electrically coupled between the power supply voltage (12V) and the precision current sink 118. The polarity inverting charge pump 410 provides a negative bias voltage (shown as −V) to the precision current sink 118 to increase its overall operating voltage used to sink an accurate current through the compensating reference element 116. For example, if an input node 412 to the precision current sink 118 has a small voltage of 0.5V, and if the negative bias voltage (−V) output from the polarity inverting charge pump 410 is −5V, then the total operating voltage across the precision current sink 118 is 0.5V−(−5V)=5.5V. In this example, an operating voltage of 5.5V across the precision current sink 118 is sufficiently large to allow the precision current sink 118 to accurately control the current pulled through the compensating reference element 116. Thus, in certain embodiments, negatively biasing the precision current sink 118 allows the comparator to detect CPU virus currents at CPU voltages below 1000 millivolts. Other embodiments not having negatively biased precision current sink may allow detection at CPU voltages greater than 1000 mV (1V).

In certain embodiments, the detector 400 further includes a capacitor 414 in parallel with the compensating reference element 116. Thus, the capacitor 414 is configured as a low-pass filter to increase the comparator noise immunity.

Example Embodiments

The following examples pertain to further embodiments.

In Example 1, a circuit includes a sense element, a compensating reference element, a comparator, and a precision current sink. The sense element conveys current from a source to a load and has a resistance that changes in response to a change in temperature of the sense element. The compensating reference element is located proximate to the sense element and has a resistance configured to change in response to the change in the temperature of the sense element. The comparator includes a first input coupled to the sense element, a second input coupled to the compensating reference element, and an output. The comparator is configured to assert a signal on the output in response detecting that a first voltage on the first input equals a second voltage on the second input. The precision current sink is coupled to the second input of the comparator and is configured to pull constant current through the compensating reference element based on a predetermined power threshold.

Example 2 includes the circuit of Example 1, wherein the sense element includes a power plane between layers of insulating circuit board material of a baseboard.

Example 3 includes the circuit of Example 2, wherein the compensating reference element includes an electrically conductive trace on or in the baseboard and separated from the power plane by one of the layers of insulating circuit board material. The electrically conductive trace having a serpentine pattern over the power plane.

Example 4 includes the circuit of Example 1, wherein the compensating reference element includes a positive thermal coefficient thermistor.

Example 5 includes the circuit of Example 1, wherein the first input coupled to the sense element is an inverting input of the comparator and the second input coupled to the compensating reference element is a non-inverting input of the comparator.

Example 6 includes the circuit of Example 1, wherein the comparator is configured to assert the signal on the output in less than one microsecond after a spike in power from the source to the load exceeds the predetermined power threshold.

Example 7 includes the circuit of Example 1, and further includes a polarity inverting charge pump to provide a negative bias voltage to the precision current sink. The negative bias voltage to generate an operating voltage across the precision current sink sufficient to accurately control the constant current pulled through the compensating reference element.

Example 8 includes the circuit of Example 7, wherein the comparator is configured to detect voltages in a range between about 200 millivolts and about 500 millivolts.

In Example 9, a system includes a central processing unit (CPU), a voltage regulator to provide power at an input of the CPU, and a CPU maximum power detector apparatus. The CPU maximum power detector apparatus includes a sense resistance and a compensation resistance to track the effect of temperature changes of the sense resistance. The voltage regulator to provide a first current through the sense resistance to the input of the CPU. The CPU maximum power detector apparatus further includes means to sink a second current through the compensation resistance based on a predetermined power threshold, and means to throttle the CPU when the power at the input of the CPU reaches the predetermined power threshold.

Example 10 includes the system of Example 9, wherein the means to throttle the CPU includes means to compare a first voltage drop across the sense resistance with a second voltage drop across the compensation resistance.

Example 11 includes the system of Example 10, wherein the means to compare is configured to provide an alert signal to the CPU in less than one microsecond after a spike in the power at the input of the CPU exceeds the predetermined power threshold.

Example 12 includes the system of Example 11, wherein the means to throttle includes a power control unit (PCU) configured to reduce CPU power in response to the alert signal from the means to compare.

Example 13 includes the system of Example 10, and further includes a biasing means to generate an operating voltage across the means to sink the second current, the operating voltage sufficient for the means to sink the second current such that the means to compare is configured to detect currents at CPU voltages below 1V.

Example 14 includes the system of Example 9, and further includes a baseboard for electrically interconnecting the CPU with the voltage regulator and the CPU maximum power detector apparatus.

Example 15 includes the system of Example 14, wherein the sense resistance includes a power plane between layers of insulating circuit board material of the baseboard.

Example 16 includes the system of Example 15, wherein the compensation resistance includes an electrically conductive trace on or in the baseboard and separated from the power plane by one of the layers of insulating circuit board material. The electrically conductive trace has a serpentine pattern over the power plane.

Example 17 includes the system of Example 9, wherein the compensation resistance includes a positive thermal coefficient thermistor.

In Example 18, a method includes providing a first current through a sense element to a processor, sinking a second current through a compensation element, comparing a first voltage drop across the sense element with a second voltage drop across the compensation element, and providing, based on the comparison, an alert signal to the processor each time the first voltage drop across the sense element equals the second voltage drop across the compensation element.

Example 19 includes the method of Example 18, wherein providing the first current through the sense element includes applying the current to a power plane of a circuit board.

Example 20 includes the method of Example 19, wherein sinking the second current through the compensation element includes pulling a constant current through a trace formed over the power plane in or on the circuit board.

Example 21 includes the method of Example 18, wherein sinking the second current through the compensation element includes pulling a constant current through a positive thermal coefficient thermistor located proximate to the sense element.

Example 22 includes the method of Example 18, and further includes providing the alert signal to the processor within one microsecond of detecting a power spike.

Example 23 includes the method of Example 22, and further includes biasing a current sink configured to sink the second current through the compensation element, the biasing allowing the detection of currents at CPU voltages below 1V.

In Example 24, an apparatus includes means to perform a method as recited in any one of Examples 18-23.

In Example 25, an apparatus includes sensing means, compensating means, thresholding means, and detecting means. The sensing means to sense power provided from a source to a load. The sensing means is responsive to a change in temperature. The compensating means is responsive to the change in the temperature. The thresholding means to set the compensating means at a maximum power threshold level. The detecting means to generate a signal in response to the sensed power of the sensing means reaching the maximum power threshold level.

Example 26 includes the apparatus of Example 25, wherein the detecting means compares a voltage drop across the sensing means with a voltage drop across the compensating means.

Example 27 includes the apparatus of any of Examples 25-26, wherein the compensating means is located proximate to the sensing means.

Example 28 includes the apparatus of any of Examples 25-27, wherein the thresholding means sinks a constant current through the compensating means.

Example 29 includes the apparatus of any of Examples 25-28, wherein the detecting means generates the signal in less than one microsecond after a spike in power from the source to the load exceeds the predetermined power threshold.

Example 30 includes the apparatus of any of Examples 25-29, and further includes polarity inverting means to generate an operating voltage across the thresholding means.

In Example 31, a method includes sensing power provided from a power source to a central processing unit (CPU) through a power plane of a circuit board, sinking current through a resistive element configured to track temperature changes in the power plane, wherein sinking the current establishes a threshold power value, and throttling the CPU when the sensed power provided from the power source to the CPU through the power plane reaches the threshold power value.

Example 32 includes the method of Example 31, wherein sinking the through the resistive element includes pulling a constant current through a trace formed proximate to the power plane in or on the circuit board.

Example 33 includes the method of Example 31, wherein sinking the through the resistive element includes pulling a constant current through a positive thermal coefficient thermistor located proximate to the sense element.

Example 34 includes the method of any of Examples 31-33, and further includes biasing a current sink configured to sink the current through the resistive element, the biasing allowing the detection of currents at CPU voltages below 1.8V.

Example 35 includes an apparatus comprising means to perform a method as recited in any one of Examples 31-34.

Embodiments disclosed herein provide accurate, non-intrusive detection of CPU virus current in less than one microsecond at a supply voltage of a few hundred millivolts, without intrusion into the power distribution path and with little or no dissipation of additional power associated with current sensing. In addition, or in other embodiments, precision CPU maximum power detection is combined with fast power throttling to shorten the duration of a CPU current spike associated with power virus from several milliseconds to a fraction of a microsecond. This allows, for example, support of a turbo mode where the TDP rating is exceeded (e.g., doubled), without using additional buffers on the baseboard, and without impact to the CPU voltage regulator and server power supply size and cost. Thus, the previous generation of power supplies may be used with certain embodiments disclosed herein to power new generation CPUs that can consume higher currents in a turbo mode.

Various embodiments may be implemented using hardware elements, software elements, and/or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. might be used herein only to facilitate discussion, and carry no particular temporal or chronological significance unless otherwise indicated.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art. The scope of the present invention should, therefore, be determined only by the following claims.

The invention claimed is:

1. A circuit comprising:
 a sense element to convey current from an output of a direct current (DC) voltage regulator to a load, the sense element having a resistance that changes in response to a change in temperature of the sense element;
 a compensating reference element operably coupled to the output of the DC voltage regulator and located proximate to the sense element, the compensating reference element having a resistance configured to change in response to the change in the temperature of the sense element;
 a comparator comprising:
  a first input coupled to the sense element;
  a second input coupled to the compensating reference element; and
  an output, the comparator configured to assert a signal on the output in response to detecting that a first voltage potential on the first input equals a second voltage potential on the second input; and
 a precision DC current sink coupled to the second input of the comparator and configured to pull constant DC current through the compensating reference element based on a predetermined power threshold.

2. The circuit of claim 1, wherein the sense element comprises a power plane between layers of insulating circuit board material of a baseboard.

3. The circuit of claim 2, wherein the compensating reference element comprises an electrically conductive trace on or in the baseboard and separated from the power plane by one of the layers of insulating circuit board material, the electrically conductive trace having a serpentine pattern over the power plane.

4. The circuit of claim 1, wherein the compensating reference element comprises a positive thermal coefficient thermistor.

5. The circuit of claim 1, wherein the first input coupled to the sense element is an inverting input of the comparator and the second input coupled to the compensating reference element is a non-inverting input of the comparator.

6. The circuit of claim 1, wherein the comparator is configured to assert the signal on the output in less than one microsecond after a spike in power from the DC voltage regulator to the load exceeds the predetermined power threshold.

7. The circuit of claim 1, further comprising a polarity inverting charge pump to provide a negative bias voltage to the precision current sink, the negative bias voltage to generate an operating voltage across the precision current sink sufficient to accurately control the constant current pulled through the compensating reference element.

8. The circuit of claim 7, wherein the comparator is configured to detect voltages in a range between about 200 millivolts and about 500 millivolts.

9. A system comprising:
 a central processing unit (CPU);
 a direct current (DC) voltage regulator to provide power at an input of the CPU; and
 a CPU maximum power detector apparatus comprising:
  a sense resistance and a compensation resistance, both operably coupled to an output of the DC voltage regulator, the sense resistance having a resistance that changes with temperature, and the compensation resistance also having a resistance that changes with temperature, the DC voltage regulator to provide a first current through the sense resistance to the input of the CPU;
  means to sink a second current through the compensation resistance based on a predetermined power threshold; and
  means to throttle the CPU when the power at the input of the CPU reaches the predetermined power threshold.

10. The system of claim 9, wherein the means to throttle the CPU comprises means to compare a first voltage drop across the sense resistance with a second voltage drop across the compensation resistance.

11. The system of claim 10, wherein the means to compare is configured to provide an alert signal to the CPU in less than one microsecond after a spike in the power at the input of the CPU exceeds the predetermined power threshold.

12. The system of claim 11, wherein the means to throttle comprises a power control unit (PCU) configured to reduce CPU power in response to the alert signal from the means to compare.

13. The system of claim 10, further comprising a biasing means to generate an operating voltage across the means to sink the second current, the operating voltage sufficient for the means to sink the second current such that the means to compare is configured to detect currents at CPU voltages below 1V.

14. The system of claim 9, further comprising a baseboard for electrically interconnecting the CPU with the voltage regulator and the CPU maximum power detector apparatus.

15. The system of claim 14, wherein the sense resistance comprises a power plane between layers of insulating circuit board material of the baseboard.

16. The system of claim 15, wherein the compensation resistance comprises an electrically conductive trace on or in the baseboard and separated from the power plane by one of the layers of insulating circuit board material, the electrically conductive trace having a serpentine pattern over the power plane.

17. The system of claim 9, wherein the compensation resistance comprises a positive thermal coefficient thermistor.

18. A method comprising:
providing a first current with a direct current (DC) voltage regulator from an output of the DC voltage regulator through a sense element to a processor;
sinking a second current through a compensation element operably coupled in parallel with the sense element to the DC voltage regulator, the sense element having a resistance that changes in response to a change in temperature of the sense element;
comparing a first voltage drop across the sense element with a second voltage drop across the compensation element operably coupled to the output of the DC voltage regulator, the compensation element having a resistance that changes in response to a change in temperature of the compensation element; and
providing, based on the comparison, an alert signal to the processor each time the first voltage drop across the sense element equals the second voltage drop across the compensation element.

19. The method of claim 18, wherein providing the first current through the sense element comprises applying the current to a power plane of a circuit board.

20. The method of claim 19, wherein sinking the second current through the compensation element comprises pulling a constant current through a trace formed over the power plane in or on the circuit board.

21. The method of claim 18, wherein sinking the second current through the compensation element comprises pulling a constant current through a positive thermal coefficient thermistor located proximate to the sense element.

22. The method of claim 18, further comprising providing the alert signal to the processor within one microsecond of detecting a power spike.

23. The method of claim 22, further comprising biasing a current sink configured to sink the second current through the compensation element, the biasing allowing the detection of currents at CPU voltages below 1V.

* * * * *